United States Patent Office 3,168,563
Patented Feb. 2, 1965

3,168,563
1,4-BIS(BENZYLAMINOMETHYL)
CYCLOHEXANES
Leslie G. Humber, Montreal, Quebec, Canada, assignor to American Home Products Corporation, New York, N.Y., a corporation of Delaware
No Drawing. Filed Jan. 25, 1962, Ser. No. 168,828
 Filed Jan. 25, 1962, Ser. No. 168,828
15 Claims. (Cl. 260—570.5)

This invention relates to agents which affect lipid metabolism and to their preparation.

More particularly, my invention relates to certain new chemical compounds, derivatives of di-substituted aralkyl-aminoalkyl cyclohexanes, as well as to acid addition salts of these new chemical compounds, particularly the hydrohalide salts. It is also concerned with their preparation from available starting materials.

In base form, the novel chemical compounds to which this invention is directed may be represented by the generic structural formula:

wherein R represents hydrogen, lower alkyl, lower alkoxy, halogen, di(lower alkyl)amino, or acylamino. Where R represents a substituent other than hydrogen, its position may be ortho, meta, or para, with respect to the methylene group by which the benzene ring is attached to the nitrogen in the above formula.

The compounds of this invention, both in the form of the free bases and of salts with pharmacologically acceptable acids, are valuable as pharmacological agents, inhibiting the biosynthesis of cholesterol in vitro and lowering blood cholesterol levels in vivo.

It is well-known that high serum cholesterol levels are injurious to arterial tissue and that such injuries may be one of the causes of coronary heart disease (see, e.g., Gould, Symposium on Atherosclerosis, Publication No. 338 of the National Academy of Sciences, National Research Council, 1955; Jolliffe, Circulation, vol. XX, July 1959, page 121; or Keyes, Journal of Chronic Diseases, vol. 4, 1956, page 364). It is equally well known that the degree and duration of hypercholesteremia are the two main determining factors in the development of experimental atherosclerosis (see Adlersberg and Sobotka, "Cholesterol," Academic Press, N.Y., 1958, p. 405).

The connection between in vitro inhibition of cholesterol biosynthesis as demonstrated, e.g., on a liver homogenate, the cholesterol level lowering activity in laboratory animals, e.g., rats or rabbits, and clinical efficacy is an equally well-established fact. The drug Triparanol, or MER–29, (1-(4-diethylaminoethoxyphenyl)-1-(p-tolyl)-2-(p-chlorophenyl)-ethanol, has been shown to inhibit cholesterol biosynthesis in vitro (see Holmes, Chemical and Engineering News, April 10, 1961, page 45), to lower cholesterol levels in the rat (see Blohm and MacKenzie, Archives of Biochemistry and Biophysics, vol. 85, 1959, page 245), and to be a clinically effective agent for lowering cholesterol levels in humans (see Oaks, Lisan and Moyer, American Medical Association Archives of Internal Medicine, vol. 104, 1959, page 527).

In a similar correlation, nicotinic acid has been shown to inhibit cholesterol biosynthesis in vitro (see Gamble and Wright, Proc. Soc. Exp. Biol. Med., vol. 106, 1961, page 160), to lower cholesterol levels in the rabbit (see Merrill and Lemley-Stone, Circulation Research, vol. IV, 1957, page 617), and to be a clinically effective drug for lowering serum cholesterol levels in humans (e.g., Achor, Berge, Barker, and MacKenzie, Circulation, vol. 17, 1958, page 497).

The compounds of this invention are effective in inhibiting the biosynthesis of cholesterol in vitro by 76 percent in molar concentrations of $1 \times 10^{-4}$ to 90 percent at molar concentrations of $1 \times 10^{-6}$. They are equally effective in lowering cholesterol levels in the rat by 53 percent to 62 percent when administered by S.C. injection in doses of 25–75 micromoles per kilogram. They are also effective when administered orally, doses of 25 micromoles per kilogram lowering cholesterol levels in the rat by about 60 percent.

In veiw of the foregoing, the compounds of this invention are potentially useful for lowering serum cholesterol levels in humans.

Furthermore, the compounds of this application are useful as anti-bacterial agents. As such they have been found to inhibit gram positive organisms such as *Staph. pyogenes* (both penicillin sensitive and penicillin resistant strains), *Sarcina lutea*, and *Strept. faecalis*, and gram negative organisms such as *E. coli* No. 198, *Aer. aerogenes*, *Ps. aeruginosa*, *Pr. mirabilis* and *Pr. vulgaris* at concentrations from 1:1000 to 1:32,000.

The compounds of this invention may be conveniently prepared by heating 1,4-bis(aminomethyl)-cyclohexane with two molar equivalents of an aromatic aldehyde, such as benzaldehyde, or with suitably substituted benzaldehydes, and removing two molecules of water from the reaction mixture. The resulting benzylidene, or substituted benzylidene, derivative (a Schiff base) may then be reduced to the corresponding secondary amino derivative by treatment with a reducing agent, such as, for example, by treatment with sodium borohydride; hydrogen and platinum oxide; or lithium aluminum hydride. The resulting 1,4-bis(benzylaminomethyl)-cyclohexane, or 1,4-bis(substituted benzylaminomethyl) - cyclohexane, may then be converted to a suitable acid addition salt by conventional means. For example, the hydrochloride salts may be readily obtained by treatment of the base with hydrogen chloride in ether solution.

This sequence of reactions may be indicated schematically as follows:

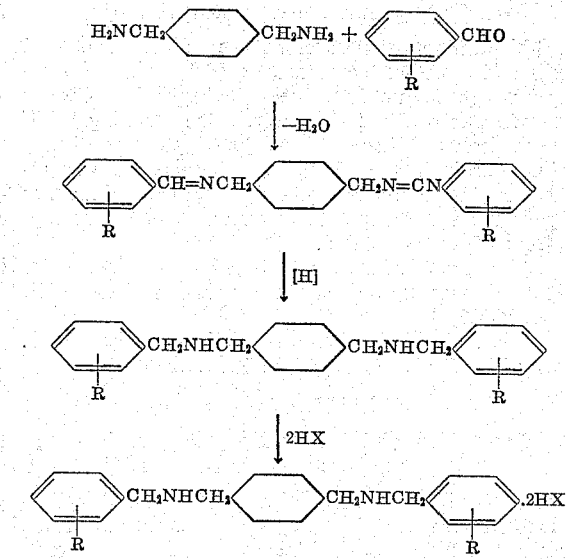

where X represents a pharmacologically acceptable anion.

EXAMPLE 1

*Preparation of 1,4-bis-(benzylaminomethyl)-cyclohexane and a salt thereof*

1,4-bis-(aminomethyl)-cyclohexane (28.4 gm., 0.2 mole) and benzaldehyde (42.45 gm., 0.4 mole) were combined in anhydrous benzene and heated to reflux. When the theoretical amount of water had been collected in a Dean-Stark trap (3–4 hours), the solution was cooled and evaporated to leave a viscous oil which was dissolved in methanol (150 ml.). Sodium borohydride (15.4 gm.) was added portionwise to the solution at such a rate that the vigorous reaction could be controlled by cooling. After all the borohydride was added, the mixture was refluxed for three hours. The methanol was removed by distillation and the residue distributed between water and ether. The ethereal solution was washed well with water, dried and evaporated to yield the title compound as a viscous oil, $\lambda$ max. 247 m$\mu$, $\epsilon$=274; 253 m$\mu$, $\epsilon$=343; 259 m$\mu$, $\epsilon$=408; 265 m$\mu$, $\epsilon$=306. The dihydrochloride was prepared by dissolving the free base in ether and treating with two equivalents of hydrogen chloride in ether. The precipitated dihydrochloride was crystallized from ethanol and had M.P. 358° C. (decomp.).

Calculated for $C_{22}H_{32}N_2Cl_2$: N, 7.08%; Cl, 17.93%. Found: N, 7.12, 7.18%; Cl, 18.05, 18.06%.

EXAMPLE 2

*Preparation of 1,4-bis-(o-methylbenzylaminomethyl)-cyclohexane and a salt thereof*

1,4-bis-(aminomethyl)-cyclohexane (14.2 gm., 0.1 mole) and o-tolualdehyde were combined in benzene and refluxed until the theoretical quantity of water had been removed azeotropically. The benzene was removed and the resulting dark oil was dissolved in methanol and treated portionwise with sodium borohydride (3.6 gm.). The reduction product was worked up as previously described to yield the title compound as a light yellow oil which solidified on standing at room temperature, $\lambda$ max. 263 m$\mu$, $\epsilon$=535; 272 m$\mu$, $\epsilon$=408.

The dihydrochloride was prepared by treating the free base with ethereal hydrogen chloride. It was crystallized from a methanol-ether mixture and had M.P. 320° C. (decomp.).

Calculated for $C_{24}H_{36}N_2Cl_2$: N, 6.61%; Cl, 16.74%. Found: N, 6.75%, 6.61%; Cl, 16.63%, 16.85%.

EXAMPLE 3

*Preparation of 1,4-bis-(o-methoxybenzylaminomethyl)-cyclohexane and a salt thereof*

1,4-bis-(aminomethyl)-cyclohexane (14.2 gm., 0.1 mole) and o-methoxybenzaldehyde (0.2 mole) were refluxed in benzene until the theoretical quantity of water had been removed azeotropically. The resulting Schiff base was isolated, dissolved in methanol, and treated with sodium borohydride (3.7 gm.). The mixture was refluxed for three hours and worked up in the usual manner to yield the title compound as an oil, $\lambda$ max. 273 m$\mu$, $\epsilon$=4200; 280 m$\mu$, $\epsilon$=3940.

The dihydrochloride was prepared as previously described. It was crystallized from ethanol and had M.P. 250–252° C.

Calculated for $C_{24}H_{36}O_2N_2Cl_2$: N, 6.15%; Cl, 15.57%. Found: N, 6.39%, 6.38%; Cl, 15.32%, 15.26%.

EXAMPLE 4

*Preparation of 1,4-bis-(o-chlorobenzylaminomethyl)-cyclohexane and a salt thereof*

1,4-bis-(aminomethyl)-cyclohexane (0.1 mole) and o-chlorobenzaldehyde (0.2 mole) were refluxed in benzene for six hours. The Schiff base was obtained as a solid precipitate. It was separated by filtration, dried and suspended in methanol. Sodium borohydride (6.5 gm.) was added portionwise to the suspension and as the double bonds were reduced, the product went into solution. The clear solution was refluxed for three hours and the title compound was isolated as previously described. It was an oil which solidified on standing at room temperature, $\lambda$ max. 285 m$\mu$, $\epsilon$=463; 264 m$\mu$, $\epsilon$=487; 273 m$\mu$, $\epsilon$=311.

The dihydrochloride was prepared in the usual manner and crystallized from methanol-ether. It had M.P. 286–288° C.

Calculated for $C_{22}H_{30}N_2Cl_4$: N, 6.03%; Cl, 30.54%. Found: N, 5.80%, 5.65%; Cl, 30.54%, 30.05%.

EXAMPLE 5

*Preparation of 1,4-bis-(p-chlorobenzylaminomethyl)-cyclohexane and a salt thereof*

1,4-bis-(aminomethyl)-cyclohexane (0.1 mole) and p-chlorobenzaldehyde were refluxed in benzene for five hours. The solid Schiff base which formed was isolated by filtration, suspended in methanol, and treated portionwise with sodium borohydride (7.6 gm.). After three hours of refluxing, a homogeneous solution resulted. The title compound was isolated in the usual manner. It was a light yellow oil, $\lambda$ max. 262 m$\mu$, $\epsilon$=578; 268 m$\mu$, $\epsilon$=671; 277 m$\mu$, $\epsilon$=480.

The dihydrochloride, prepared in the usual manner, was crystallized from methanol-ether. It had M.P. >360° C.

Calculated for $C_{22}H_{30}N_2Cl_4$: N, 6.03%; Cl, 30.54%. Found: N, 5.73%, 5.87%; Cl, 30.38%.

EXAMPLE 6

*Preparation of 1,4-bis-(p-dimethylaminobenzylaminomethyl)-cyclohexane and a salt thereof* p-Dimethylaminobenzaldehyde (0.2 mole) and 1,4-bis-(aminomethyl)-cyclohexane were refluxed in benzene to yield the Schiff base as a solid. It was suspended in methanol and treated portionwise with sodium borohydride. After refluxing for thirty minutes, the mixture became homogeneous. Working up the mixture as previously described yielded the title compound as a semi-solid, $\lambda$ max. 263 m$\mu$, $\epsilon$=37,100; 305 m$\mu$, $\epsilon$=4,060. A tetra hydrochloride was prepared and crystallized from ethanol-ether. It had M.P. >360° C.

Calculated for $C_{26}H_{44}N_4Cl_4$: N, 10.10%; Cl, 25.57%. Found: N, 9.78%, 9.97%; Cl, 25.20%, 25.16%.

EXAMPLE 7

*Preparation of 1,4-bis-(m-chlorobenzylaminomethyl)-cyclohexane and a salt thereof* m-Chlorobenzaldehyde (28.0 gm., 0.2 mole) and 1,4-bis-(aminomethyl)-cyclohexane (14.2 gm., 0.1 mole) were converted to the Schiff base in the usual manner. The solid Schiff base was suspended in methanol and treated portionwise with sodium borohydride (7.6 gm.). During the reaction the mixture became homogeneous and the title compound was obtained as an oil, $\lambda$ max, 255 m$\mu$, $\epsilon$=526; 262 m$\mu$, $\epsilon$=628; 267 m$\mu$, $\epsilon$=764; 276 m$\mu$, $\epsilon$=610. It was converted to the dihydrochloride salt in the usual manner. It was crystallized from dilute ethanol and had M.P. 314–315° C.

Calculated for $C_{22}H_{30}N_2Cl_4$: Cl, 30.54%; N, 6.03%. Found: Cl, 30.32%; N, 5.74%, 5.77%.

EXAMPLE 8

*Preparation of 1,4-bis-(p-methylbenzylaminomethyl)-cyclohexane and a salt thereof*

1,4-bis-(aminomethyl)-cyclohexane (14.2 gm., 0.1 mole) and p-tolualdehyde were combined in benzene and refluxed until the theoretical quantity of water had been removed azeotropically. The benzene was removed and the resulting oil was dissolved in methanol and treated portionwise with sodium borohydride (7.6 gm.). The reduction product was worked up as previously described to yield the title compound as a yellow oil, $\lambda$ max. 259 m$\mu$, $\epsilon$=506; 264 m$\mu$, $\epsilon$=631; 274 m$\mu$, $\epsilon$=532.

The dihydrochloride was prepared by treating the free base with ethereal hydrogen chloride. It was crystallized from a methanol-water mixture and had M.P. 357–358° C.

Calculated for $C_{24}H_{36}N_2Cl_2$: N, 6.61%; Cl, 16.74%. Found: N, 6.31%, 6.24%; Cl, 16.75%, 16.65%.

EXAMPLE 9

*Preparation of 1,4-bis-(p-acetamidobenzylaminomethyl)-cyclohexane and a salt thereof* p-Acetamidobenzaldehyde (32.6 gm.) and 1,4-bis-(aminomethyl)-cyclohexane (14.1 gm.) were converted to the Schiff base in the manner described above. It was obtained as a solid and had bands in the infrared at 3400 cm.$^{-1}$; 1675 cm.$^{-1}$, and 1652 cm.$^{-1}$. The Schiff base (30.0 gm.) was dissolved in methanol and treated portionwise with sodium borohydride (7.5 gm.). After refluxing for three hours, the reaction was worked up in the usual manner to yield the title compound. It was a solid and had infrared bands at 1605 cm.$^{-1}$ and 1665 cm.$^{-1}$. It showed absorption in the ultraviolet at λ max. 247 mμ, ε=35,800. A dihydrochloride was prepared with methanolic hydrogen chloride and was crystallized from water. It had M.P. >360° C.

Calculated for $C_{26}H_{38}N_4O_2Cl_2$: N, 10.99%; Cl, 13.91%. Found: N, 10.78%, 10.70%; Cl, 13.65%, 13.49%.

I claim:

1. A compound selected from the group consisting of bases of the formula:

wherein R is selected from the group consisting of hydrogen, lower alkyl, lower alkoxy, halogen, di(lower alkyl)-amino, and acetamido, and acid addition salts of said bases with pharmacologically-acceptable acids.

2. 1,4-bis-(benzylaminomethyl)-cyclohexane.
3. 1,4-bis(o-methylbenzylaminomethyl)-cyclohexane.
4. 1,4-bis-(o-methoxybenzylaminomethyl)-cyclohexane.
5. 1,4-bis-(o-chlorobenzylaminomethyl)-cyclohexane.
6. 1,4-bis-(p-chlorobenzylaminomethyl)-cyclohexane.
7. 1,4-bis-(p-dimethylaminobenzylaminomethyl)-cyclohexane.
8. 1,4-bis-(m-chlorobenzylaminomethyl)-cyclohexane.
9. The dihydrochloride salt of 1,4-bis-(benzylaminomethyl)-cyclohexane.
10. The dihydrochloride salt of 1,4-bis-(o-methylbenzylaminomethyl)cyclohexane
11. The dihdrochloride salt of 1,4-bis-(o-methoxybenzylaminomethyl)-cyclohexane.
12. The dihydrochloride salt of 1,4-bis-(o-chlorobenzylaminomethyl)-cyclohexane.
13. The dihydrochloride salt of 1,4-bis-(p-chlorobenzylaminomethyl)-cyclohexane.
14. The tetrahydrochloride salt of 1,4-bis-(p-dimethylaminobenzylaminomethyl)-cyclohexane.
15. The dihydrochloride salt of 1,4-bis-(m-chlorobenzylaminomethyl)-cyclohexane.

References Cited in the file of this patent

UNITED STATES PATENTS 2,653,977   Craig et al. _____ Sept. 29, 1953

FOREIGN PATENTS 605,034   Canada _____ Sept. 13, 1960

OTHER REFERENCES

Morton: The Chemistry of Heterocyclic Compounds (textbook), page VI of the preface (1946), McGraw-Hill publisher.

Malachowski et al.: Chemische Berichte, vol. 71, pages 759–67 (1938).

UNITED STATES PATENT OFFICE
CERTIFICATE OF CORRECTION

Patent No. 3,168,563                           February 2, 1965

Leslie G. Humber

It is hereby certified that error appears in the above numbered patent requiring correction and that the said Letters Patent should read as corrected below.

Column 1, lines 11 and 12, for "metabolish" read -- metabolism --; column 2, line 11, for "veiw" read -- view --; lines 47 to 51, for that portion of the formula reading "$CH_2N=CN$" read -- $CH_2N=CH$ --; column 5, lines 24 to 26, the formula should appear as shown below instead of as in the patent:

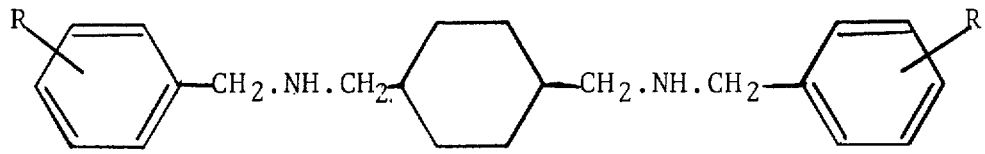

Signed and sealed this 17th day of August 1965.

(SEAL)
Attest:

ERNEST W. SWIDER                              EDWARD J. BRENNER
Attesting Officer                             Commissioner of Patents